(12) United States Patent
Sales Casals

(10) Patent No.: US 9,553,399 B2
(45) Date of Patent: Jan. 24, 2017

(54) METHOD FOR INSTALLING OF A WET MATEABLE CONNECTION ASSEMBLY FOR ELECTRICAL AND/OR OPTICAL CABLES

(71) Applicant: PRYSMIAN S.P.A., Milan (IT)

(72) Inventor: Lluis Ramon Sales Casals, Milan (IT)

(73) Assignee: PRYSMIAN S.P.A, Milan (IT)

( * ) Notice: Subject to any disclaimer, the term of this patent is extended or adjusted under 35 U.S.C. 154(b) by 0 days.

(21) Appl. No.: 14/767,785

(22) PCT Filed: Feb. 15, 2013

(86) PCT No.: PCT/IB2013/051237
§ 371 (c)(1),
(2) Date: Aug. 13, 2015

(87) PCT Pub. No.: WO2014/125334
PCT Pub. Date: Aug. 21, 2014

(65) Prior Publication Data
US 2016/0036160 A1    Feb. 4, 2016

(51) Int. Cl.
*H01R 13/523* (2006.01)
*G02B 6/38* (2006.01)
*H02G 1/10* (2006.01)

(52) U.S. Cl.
CPC .......... *H01R 13/523* (2013.01); *G02B 6/3816* (2013.01); *H02G 1/10* (2013.01); *G02B 6/3817* (2013.01)

(58) Field of Classification Search
USPC ............... 439/191, 194, 588; 441/3, 5, 88; 114/230.12, 326, 51
See application file for complete search history.

(56) References Cited

U.S. PATENT DOCUMENTS

| 4,203,640 | A | * | 5/1980 | Bice | H01R 13/4532 |
| | | | | | 439/139 |
| 4,650,431 | A | * | 3/1987 | Kentosh | B63B 21/50 |
| | | | | | 114/230.2 |
| 5,067,429 | A | * | 11/1991 | Castel | B63B 22/023 |
| | | | | | 114/230.26 |
| 5,170,737 | A | * | 12/1992 | Poldervaart | B63B 22/025 |
| | | | | | 114/230.12 |

(Continued)

FOREIGN PATENT DOCUMENTS

| WO | WO 96/22554 | 7/1996 |
| WO | WO 2014/125333 | 7/1996 |

OTHER PUBLICATIONS

International Search Report from the European Patent Office for International Application No. PCT/IB2013/051237, mailing date Nov. 6, 2013.

(Continued)

*Primary Examiner* — Alexander Gilman
(74) *Attorney, Agent, or Firm* — Finnegan, Henderson, Farabow, Garrett & Dunner, L.L.P.

(57) ABSTRACT

A method for underwater installing of a wet mateable connection assembly includes the steps of: providing a submerged case having a seat; connecting one end of a guiding rope to the seat, the other end being kept over the sea level; appending a submersible case to the guiding rope by a guide handle; causing the submersible case to move along the rope until the guide handle engages with the seat; and pivoting the submersible case around the seat up to contact the submerged case.

13 Claims, 9 Drawing Sheets

(56) References Cited

U.S. PATENT DOCUMENTS

| | | | | |
|---|---|---|---|---|
| 5,363,789 A * | 11/1994 | Laurie | ............... | B63B 21/508 |
| | | | | 114/293 |
| 5,645,438 A * | 7/1997 | Cairns | ............... | G02B 6/3816 |
| | | | | 439/139 |
| 5,722,842 A | 3/1998 | Cairns | | |
| 6,261,142 B1 * | 7/2001 | Fiotakis | ............... | A01K 69/06 |
| | | | | 441/11 |
| 6,736,545 B2 | 5/2004 | Cairns et al. | | |
| 7,028,627 B2 * | 4/2006 | Bouchaud | ............... | B63B 27/36 |
| | | | | 114/259 |
| 7,083,452 B2 * | 8/2006 | Eriksson | ............... | H01F 38/14 |
| | | | | 439/194 |
| 7,083,487 B2 * | 8/2006 | Weinel | ............... | B63C 9/082 |
| | | | | 441/131 |
| 7,114,970 B2 * | 10/2006 | Head | ............... | E21B 17/028 |
| | | | | 439/191 |
| 7,566,235 B2 * | 7/2009 | Bottos | ............... | E21B 4/02 |
| | | | | 439/191 |
| 7,959,480 B2 * | 6/2011 | Lindblade | ............... | B63B 21/508 |
| | | | | 114/230.12 |
| 8,418,639 B2 * | 4/2013 | Hooper | ............... | B63B 21/508 |
| | | | | 114/230.12 |
| 8,449,341 B2 * | 5/2013 | Denise | ............... | B63B 21/508 |
| | | | | 114/230.12 |
| 8,641,324 B2 * | 2/2014 | Quash | ............... | B63B 27/24 |
| | | | | 405/158 |
| 8,763,549 B2 * | 7/2014 | Liu | ............... | B63B 21/00 |
| | | | | 114/230.1 |
| 8,833,288 B2 * | 9/2014 | Bertelsen | ............... | B63G 8/001 |
| | | | | 114/312 |
| 2003/0007738 A1 * | 1/2003 | Cairns | ............... | G02B 6/3816 |
| | | | | 385/56 |

OTHER PUBLICATIONS

Written Opinion of the International Searching Authority from the European Patent Office for International Application No. PCT/IB2013/051237, mailing date Nov. 6, 2013.

Molland, A.F., "Underwater vehicles", The Maritime Engineering Reference Book, Elsevier Ltd., pp. 741, (2008).

* cited by examiner

METHOD FOR INSTALLING OF A WET MATEABLE CONNECTION ASSEMBLY FOR ELECTRICAL AND/OR OPTICAL CABLES

CROSS REFERENCE TO RELATED APPLICATION

This application is a national phase application based on PCT/IB2013/051237, filed Feb. 15, 2013, the content of which is incorporated herein by reference.

BACKGROUND OF THE INVENTION

Field of the Invention

The present invention relates to method for installing of a wet mateable connection assembly for undersea energy applications.

In particular the present invention especially refers to a wet mateable connection assembly for electrical and/or optical cables.

In particular, the present invention especially refers to a wet mateable connection assembly for medium and high voltage electrical cables. Typically, by medium voltage cables we mean cables suitable for more than 1 kV and up to about 30 KV, and for high voltage cables we mean cables suitable for operating above about 30 kV.

Description of the Related Art

The oceanic/undersea energy generation is growing at a fast speed and in this field the technologies used to generate energy are dominantly "wind mills" but wave and tidal generators are showing some promising results.

The wind mills are generally built with fixed bottom structures and inter array cables are used to go from one turbine to the next and to the shore.

In order to connect the wind mills or similar apparatus to an electric network, cables are used wherein the cable connections may be "dry mate", i.e. the ends of the cables coming from the wind mills and of the cables of the electric network or of intermediate stations are connected together (i.e. are mated, or unmated, by means of appropriate connectors) in a dry environment (e.g on the shore or on a suitable floating vessel or ship), to avoid the presence of water at the connector interface, which may produce partial discharges and the consequent cable faults in the presence of electrical field, and subsequently laid down underwater.

Cable hubs and/or cable substations can be used for connecting two or more underwater cables of an electric network. In these cases, and especially in places where water depths exceed 40 m depth, the dry mating is more cumbersome because it implies retrieving from underwater, for example to a ship, a sunken hub or substation having a significant weight.

In similar circumstances, the dry mating is often unpractical and generally economically disadvantageous.

In offshore windmills and other submarine applications, wet mateable connection assemblies are known.

The wet mateable connection assemblies are configured to allow the cable connection to be realized directly undersea.

Known wet mateable connection assemblies utilize two connectors attached to the relevant cable ends, to be mated together. As disclosed, for example, by U.S. Pat. No. 6,736, 545, such connectors generally comprise a plug unit containing one or more contact probes and a receptacle unit containing an equivalent number of contacts or junctions for engagement with the contact probes, which extend into the receptacle unit when the units are connected to each other.

Typically, the probes enter the container via one or more openings which are sealed when the connector elements are separated.

The installation of a wet mateable connection assembly on the seabed generally comprises:
providing on the seabed a first connector case, connected to a submersed cable;
providing a second connector case, connected to a submersible cable, in a position close to the first connector case,
moving one of the connector cases in order to put in contact the two connector cases.

The moving step comprises positioning one case in alignment with the other. This step is typically performed by operators or, when the depth exceeds the safety requirements, by a remotely operated vehicle (ROV).

SUMMARY OF THE INVENTION

The Applicant experienced that the use of remotely operated vehicles suitable for positioning the connector case increases the installation cost of the connection. In addition, it can be cumbersome and sometime impossible for a ROV or for operators to handle a connector case because of the hostile environment (water pressure, submarine streams), and because of the weight of the connector case itself and of the cable connected thereto. For example, when the wet mateable connection assembly is for medium or high voltage cables, a case weight could amount up to 500 kg, and the attached cable has typically a weight of some tens of kilos per meter.

The Applicant started from the notion that transporting and positioning a rope capable of bearing the weight of the submersible case and of the cable connected thereto, weighing for example about 100 kg for a 100 m length, is much easier than transporting and positioning a case of about 350 kg with attached, for example, 100 m of cable weighing 1500-3000 kg. The use of a "light-weight" tool (the rope) allows the transport and the correct positioning of a heavy case which would be otherwise rather cumbersome to move and manage.

In the above, the present invention is concerned with a method of installation of a wet mateable connection in which a submersed first connector case with a cable attached thereto is laid down on the seabed, and, thereafter, a rope is anchored to such case to form a ropeway, effective to convey a submersible second connector case and a cable connected thereto to approach to and to align with the first connector case for mating.

The submersed connector case is provided with a seat acting as anchoring point of the ropeway and as linking point for the submersible connector case to be immersed. The submersible second connector case comprises a guide handle allowing the connector case to be suspended to the ropeway and suitable to engage with a seat of the submersed case and to pivot thereon to put the second connector case in aligned contact with the submersed case.

In one aspect, the present invention relates to a method for installing underwater a wet mateable connection assembly, the method comprising the steps of
providing a submerged case having a seat;
connecting one end of a guiding rope to the seat, another end being kept over the sea level;
suspending a submersible case to the guiding rope by a guide handle;
causing the submersible case to move along the rope until the guide handle engages with the seat;

pivoting the submersible case around the seat up to contact the submerged case.

The submersible and submerged cases of the wet mateable connection assembly contain respective first and second phase connectors mechanically and electrically connected with an electric or optical or hybrid cable.

The first and second phase connectors are suitable for establishing a reciprocal electric and mechanic connection.

The submersible and submerged cases come into contact by respective first and second coupling ends.

Advantageously, the present method comprises suspending the submersible case to an auxiliary rope. One end of the auxiliary rope can be connected to an auxiliary point of the submersible case, said auxiliary point being longitudinally spaced from the guide handle; another end of the auxiliary rope can be substantially above the sea level. The presence of the auxiliary rope allows a safer control of the submersible case during the moving step.

In the following of the present description and claims the guiding rope and the auxiliary rope could be collectively referred to as "ropeway".

Advantageously, the guiding rope and, optionally, the auxiliary rope, further sustain the submersible case by a suspender provided at a point upstream the guide handle and, optionally, upstream the auxiliary point. The guide handle have a shape suitable for guiding the case in suspension along the guiding rope, for example a U or V shape.

A V shape is preferred in case it is desired to minimize oscillation and to maintain more centered the submersible case while approaching the submerged case, thus helping the alignment and the connection of the cases.

The seat of the submerged case preferably protrudes from the second coupling end in a direction substantially parallel to the connecting axis. Preferably, the seat has a U or hook-like shape. Another aspect of the invention relates to wet mate connection assembly comprising a submersible and a submerged case to be mated along a connecting axis, said cases having respective first and second coupling end, the first coupling end having a guide handle protruding substantially perpendicularly with respect to the connection axis; and the second coupling end having a seat.

BRIEF DESCRIPTION OF THE DRAWINGS

The characteristics and advantages of a method for positioning and coupling of a wet mateable connection assembly under the sea level according to the present invention will become more apparent from the following by way of example and non-limiting description, with reference to the attached schematic drawings wherein.

DETAILED DESCRIPTION OF THE INVENTION

With reference to the figures, an embodiment of a wet-mateable connection assembly according to the present invention is shown with 10.

Figure 1:
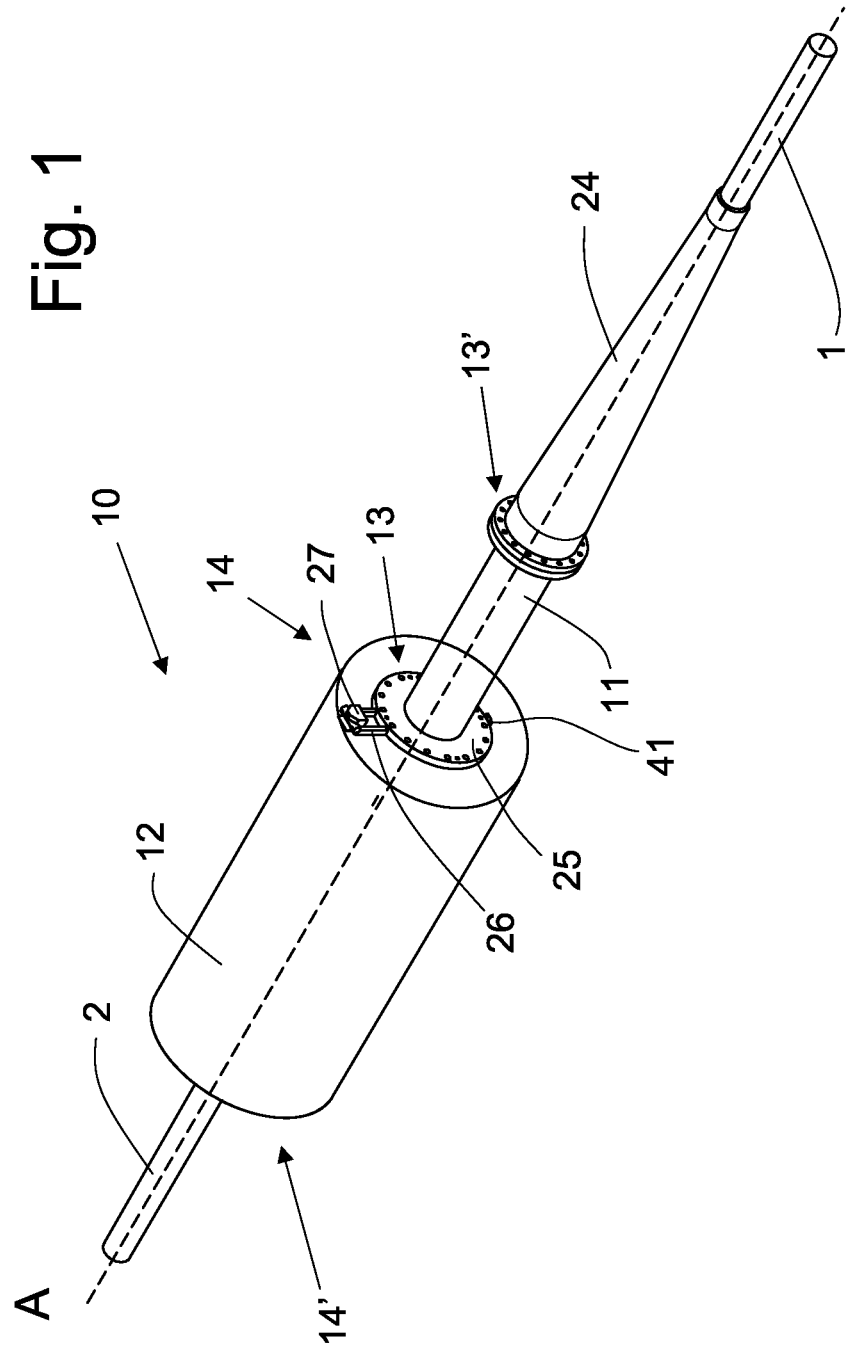
FIG. 1 is a perspective view of a wet mateable connection assembly suitable to be installed according to the method of the invention.
Figure 2:
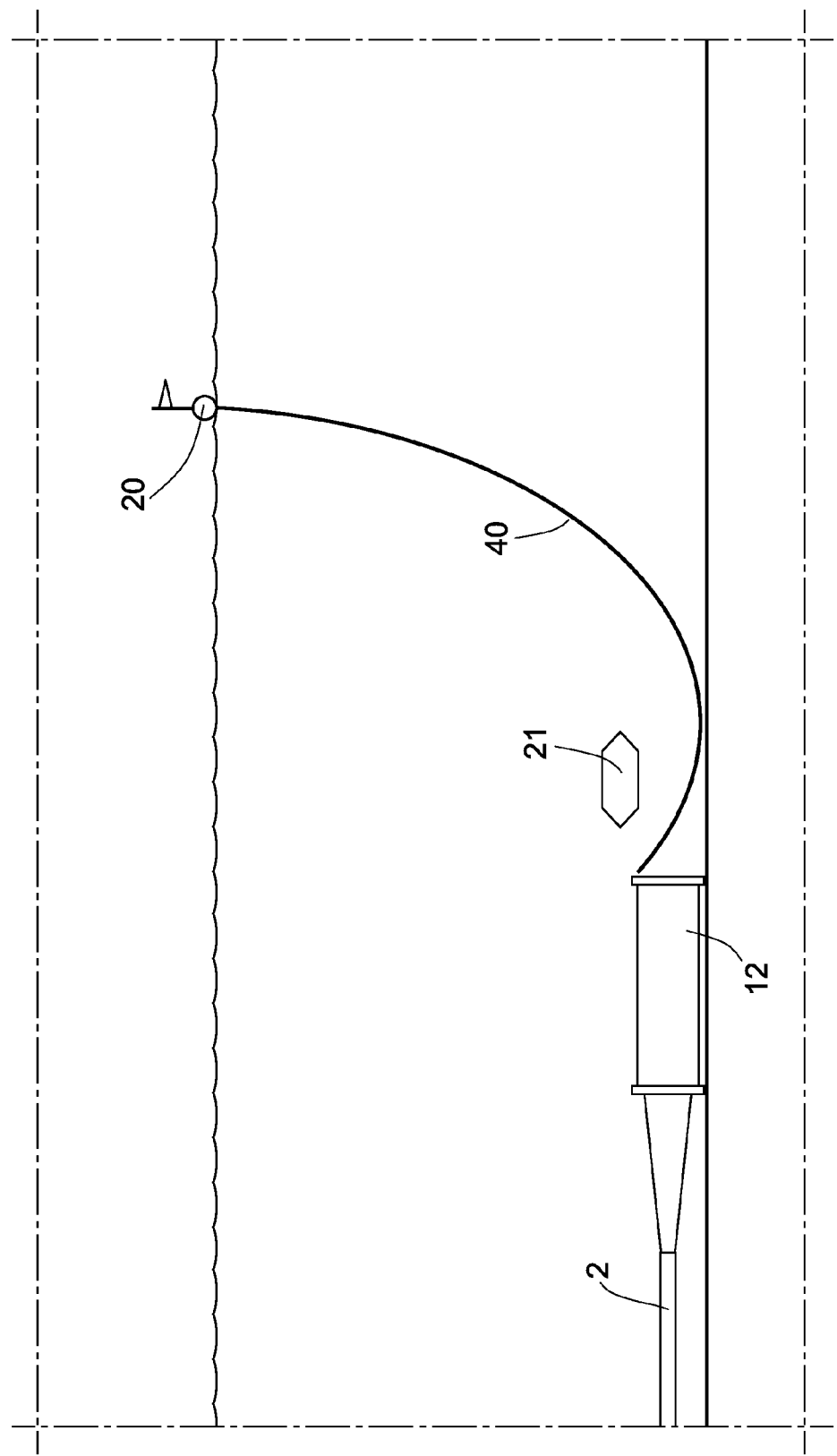
FIG. 2 schematically shows the submerged case positioned on the seabed.

With reference to FIG. 1, the wet mateable connection assembly 10 comprises a submersible watertight case 11 with a submersed cable 1 exiting therefrom and a submerged watertight case 12 with a cable 2 exiting therefrom, cases 11 and 12 being mated to each other in a watertight manner along a common longitudinal connecting axis A.

Each case 11, 12 comprises a respective first and second coupling end 13, 14 which are intended to be adjoined to each other when the two cases are mated together as shown in FIG. 1. The coupling ends 13, 14 comprise respective substantially circular apertures perpendicular to the connection axis A.

The first connection end 13 of the submersible case 11 has a flange 25 having an axial aperture.

The coupling end 13 of the submersible case 11 comprises a guide handle 26 associable with a seat 27 provided on the coupling end 14 of the submerged case 12.

Each case 11, 12 comprises a respective first and end 13', 14' opposite to the first and second coupling end 13, 14.

The submersible case 11 comprises a bend stiffener 24 fixed to the opposite end 13' through an interface joint (not illustrated), providing a smooth connection between the rigid submersible case 11 and the cable 1 connected thereto.

According to the method of the invention the submerged case 12 connected to cable 2 is submerged and put in position, for example on the seabed, by a crane vessel, for example.

As from FIGS. 2-6, one end of a guiding rope 40 is connected to the seat 27 of the submerged case 12. As from FIG. 2, the guiding rope 40 can be attached at one end to the seat 27 at the time the submerged case 12 is laid on the seabed, and its free end is kept reachable, for example, by means of a buoy 20.

Figure 7:
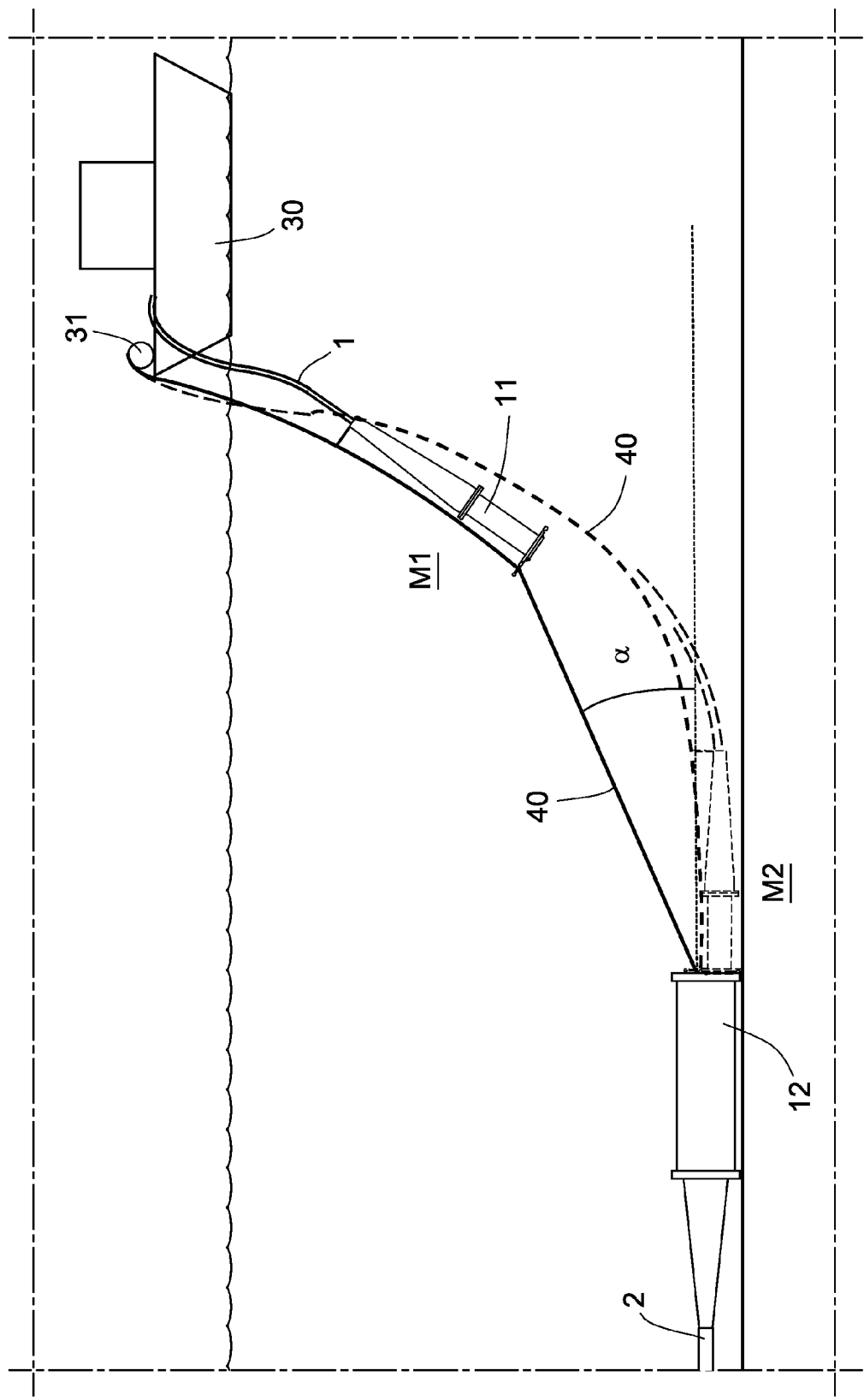

Alternatively, at the time of the connection installation, one end of the guiding rope 40 is brought down and attached to the seat 27 by a remotely operated underwater vehicle (ROV) 21, while the other end of the guiding rope 40 is kept at the water surface by means of a buoy 20 or connected to an anchoring element 31 on an installation vessel 30 (schematically illustrated in FIG. 7).

Figure 3:
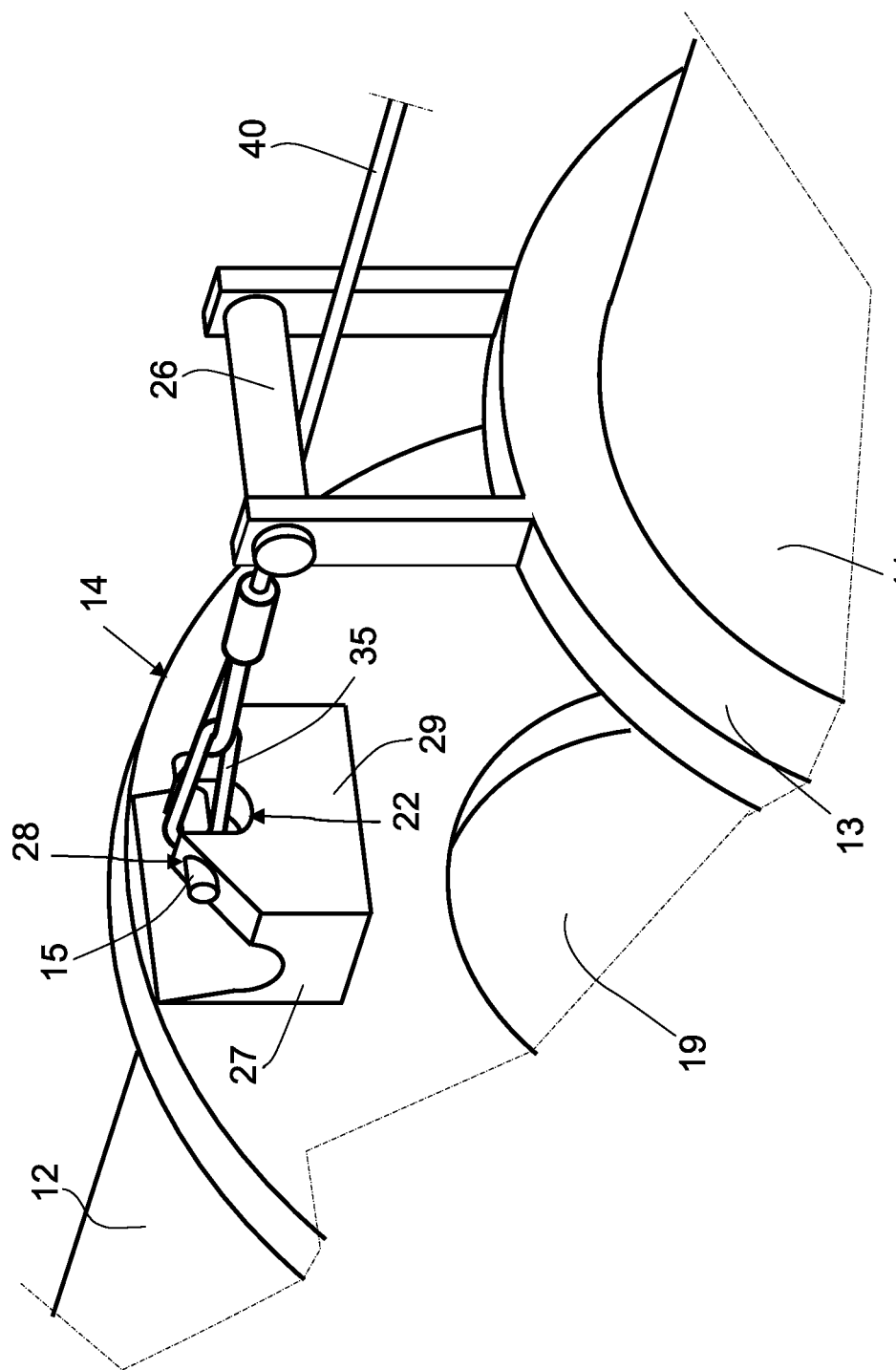
FIG. 3 shows an enlarged detail of the connection between the guiding rope and the seat.
Figure 4:
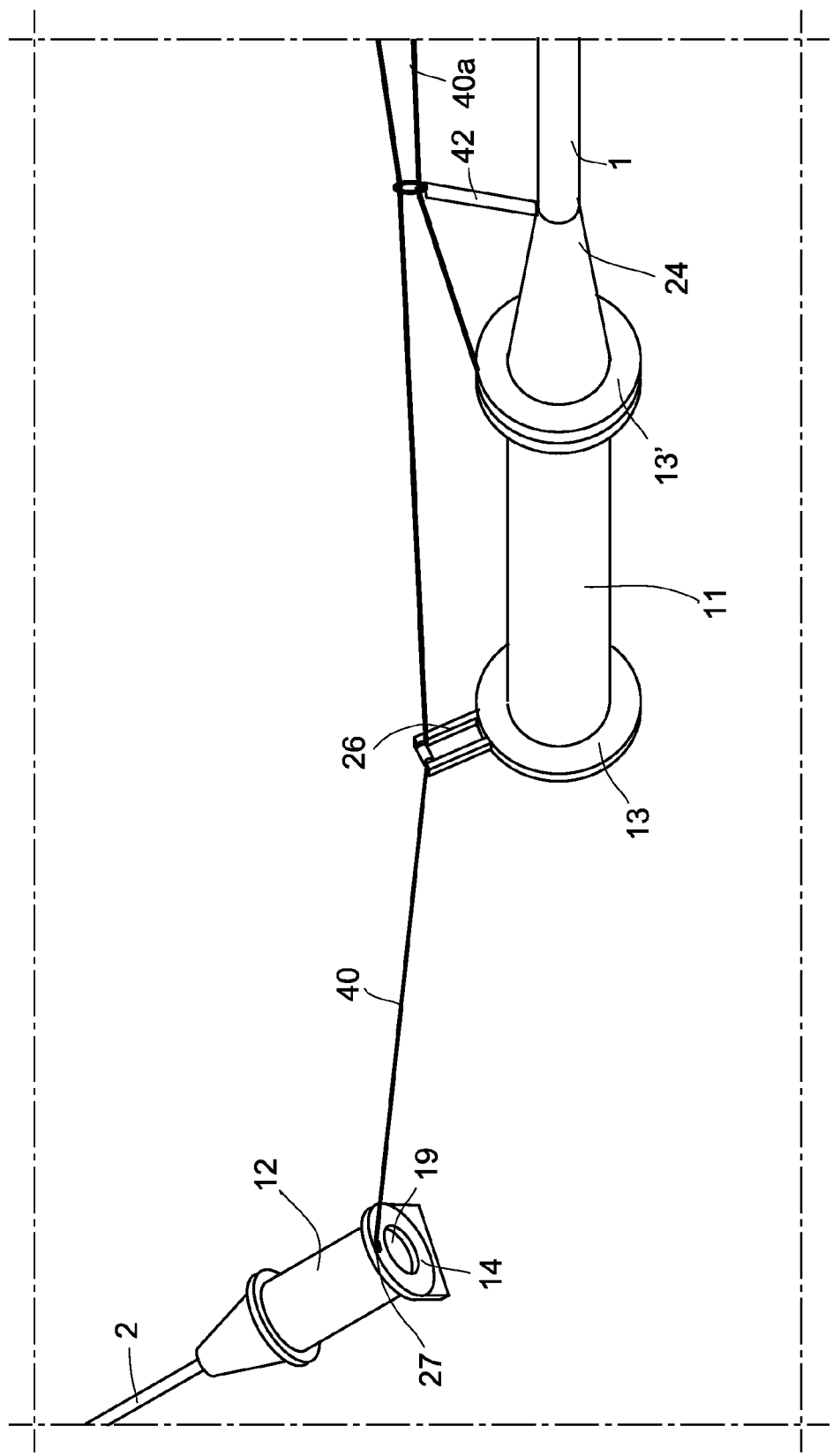
FIG. 4-7 are perspective views of steps of the method of the invention.

FIG. 3 details an example of connection between the guiding rope 40 and the seat 27 of the submerged case 12. The seat 27 is a hook-shaped element with the arm 29, spaced from the coupling end 14, having a U-shaped indentation 22. Both the upper portions of said indentation have holes 28 suitable for housing a bearing element 15, such as a bolt or a pin. A carabiner 35, advantageously a screw-lock carabiner, is provided at one end of the guiding rope 40 and is hooked to the bearing element 15, in order to provide a detachable connection. Alternatively, the guiding rope 40 can be directly tied around the bearing element 15, when the rope 40 is intended to be permanently left attached to the submerged case 12.

As from FIGS. 4-7, the submersible case 11, connected to the cable 1, is suspended to the guiding rope 40 by the guide handle 26. The guide handle 26 of the submersible case 11 slides along the guiding rope 40 connected to the seat 27 until reaching the submerged case 12.

Figure 5:
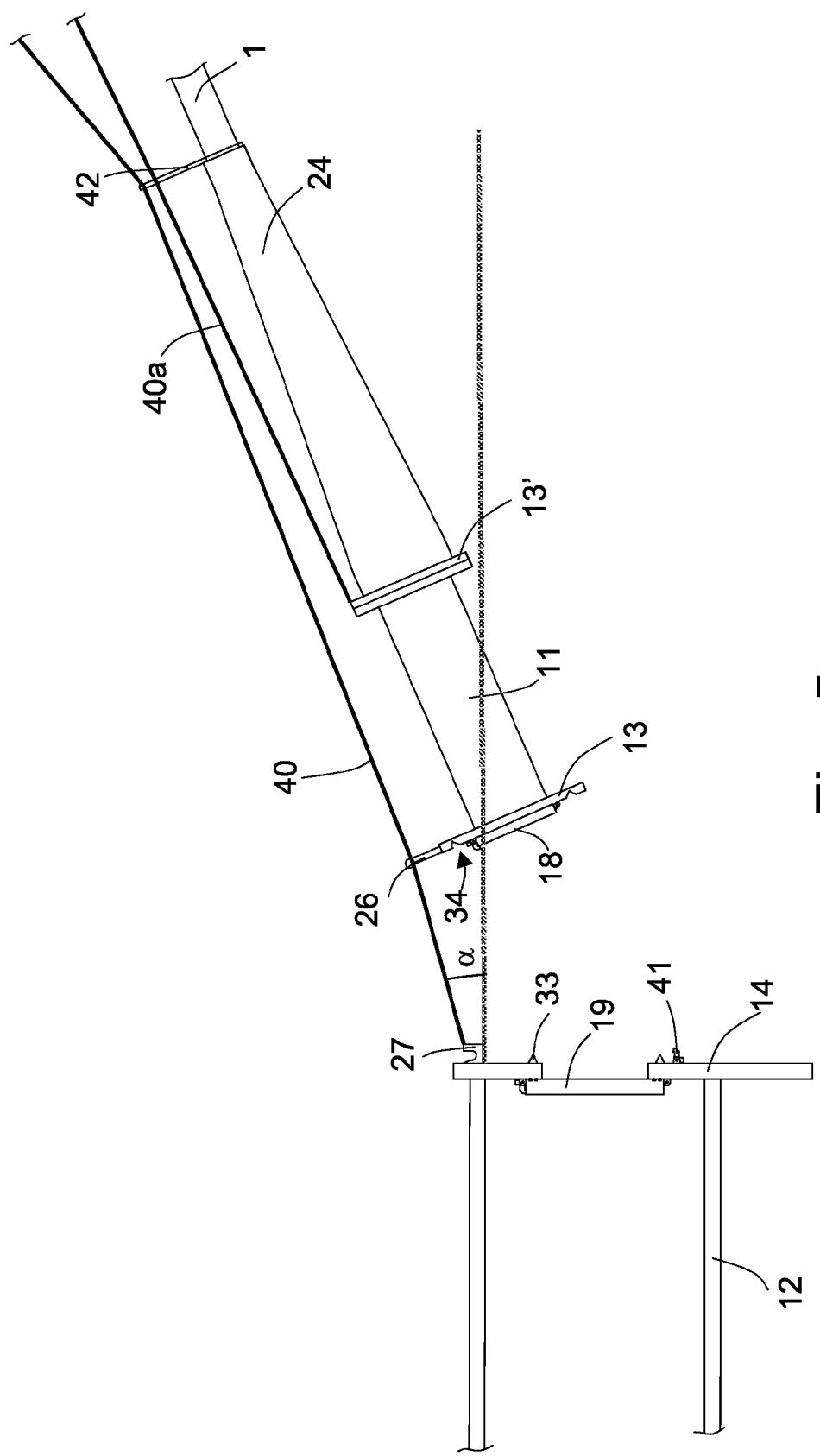
Figure 6:
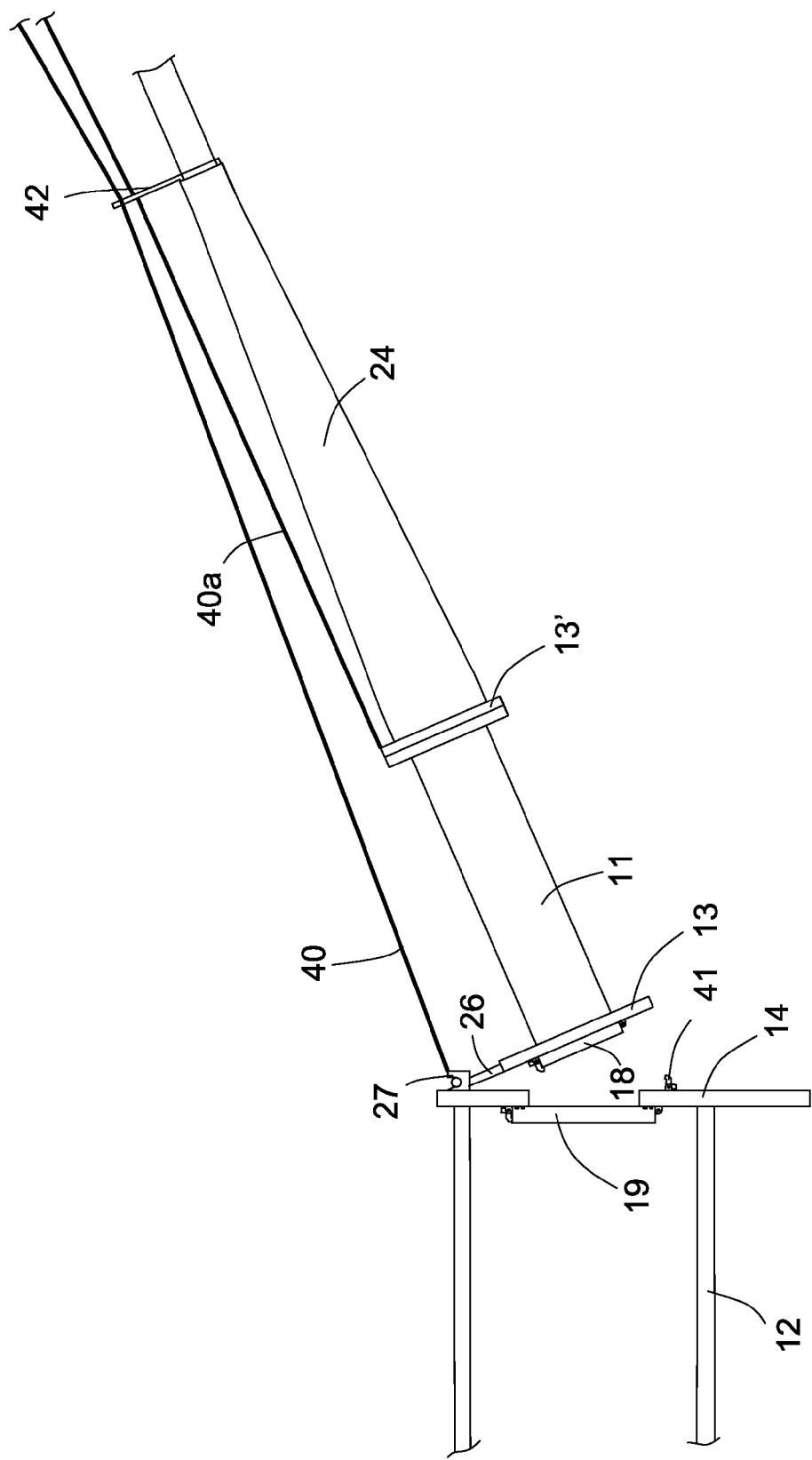

The guiding rope 40 acts as a guide for the submersible case 11 until—as shown in FIGS. 5 and 6—it reaches a position close the submerged case 12 and the guide handle 26 engages with the seat 27 without intervention of any remotely operated vehicle.

An auxiliary rope 40a can be advantageously provided, having one end connected to an auxiliary point, for example, at or in the vicinity of the opposite end 13' of the submersible case 11, while the other end is attached to a capstan of constant tension on the installation vessel.

A suspender 42 can be provided, for example, at one end of the bend stiffener 24, to engage one or, preferably, both the guiding rope 40 and the auxiliary rope 40a, when the latter is present. Along the cable length more suspenders similar to 42 are advantageously installed, for example each 5 to 10 m, to engage the guiding rope 40 to the cable, in order to force the cable to follow a similar catenary path as the one described by the guiding rope 40.

Upon engagement of guide handle 26 and seat 27, the seat 27 acts as pivoting point for the submersible case 11 with respect to the submerged case 12. The pivoting movement of the submersible case 11 with respect to the submerged case 12 is shown in FIG. 6.

At the end of the pivoting movement, the coupling ends 13, 14 get into reciprocal contact and aligned along the connecting axis A.

During the step of causing the submersible case 11 to move along the ropeway, the rope 40 is kept at a suitable tension load, effective for maintaining the lower portion of the rope 40 (loaded by the weight of the submersible case 11) at an angle $\alpha$ with respect to the horizontal plane of the seat 27 (substantially parallel to the seabed) apt to allow submersible case 11 to complete its descent movement to the submerged case 12 and the engagement between guide handle 26 and seat 27.

As from FIG. 7, when the submersible case is in position M1, close to the sea level, the tension applied to the rope 40 is such that the angle $\alpha$ is relatively large, for example, greater than 40°. The corresponding tension load is, typically, in the range of some hundreds kilos.

Such value depends on the depth where the submerged case 12 lies, on the weight of the submersible case 11, on the weight and length of cable 1 and on the weight of accessories optionally present such as the bend stiffener 24. The value of angle $\alpha$ decreases while the submersible case 11 approaches the submerged case 12, due to the weight applied to the rope 40. At the moment of engaging the guide handle 26 with the seat 27 (see FIG. 5), the angle $\alpha$ should be at least 20° to allow said engaging and the tensile load applied to the rope 40 is adjusted accordingly.

The pivoting step to get the submersible case 11 in contact with the submerged case 12 is carried out by releasing the tension on the rope 40. This tension release makes the first opposite end 13', the bend stiffener 24 and the cable end connected thereto to rotate down to a horizontal position, as from FIG. 7, position M2, bringing the connecting end 13 of the submersible case 11 in contact with the corresponding connecting end 14 on the submerged case 12.

When the sinking of the submersible case 11 starts, the angle $\alpha$ is relatively large, and can amount up to about 90°.

In this case, the submersible case 11 moves vertically along the rope 40, and substantially the whole weight of the submersible case 11 and of the relevant cable 1 is applied to cable 1 and to the auxiliary rope 40a, while the tension applied on the rope 40 is minimal, as needed to bear the rope weight and to keep it suitably stable in its position.

In case the installation vessel is far from the vertical position over the submerged case 12, the rope 40 under its own weight describes a catenary path and is further displaced from such ideal path by the effect of the weight of the submersible case 11 during its descent and the contribution of the tension applied to the cable 1 and to the auxiliary rope 40a. Preferably, the angle $\alpha$ is kept higher than 40°.

When the submersible case 11 reaches the submerged case 12, the tension applied on the rope 40 is reduced and an extra length of rope 40 is paid from the vessel 30 (or the vessel 30 itself is moved toward the submerged case 12) to enable the rotation of the submersible case 11 in its final position.

Conveniently, as from FIG. 5, the second coupling end 14 of the submerged case 12 comprises a plurality of centering studs 33, preferably conical, suitable to couple with corresponding stud seats 34 in the first flange 25, and easing the self-alignment of the submersible case 11 with respect to the submerged case 12.

Preferably, the second coupling end 14 can further comprise a locking clip 41 positioned to engage the first flange 25 at its rim. In the case depicted in FIGS. 1, 5 and 6, the locking clip 41 is in a position opposite to the seat 27. The locking clip 41 can help to keep the first coupling end 13 fastened to the second coupling end 14 before the final fixing of the coupling between the cases 11, 12.

Once the alignment and coupling between cases 11 and 12 has been obtained, the cases 11, 12 are fixed to each other, for example by bolts, as hereinafter described. The two aligned cases 11, 12 are fixed to each other to realize a watertight connection. Such operation can be made by a remotely operated underwater vehicle (ROV) bearing a suitably arranged remotely controlled operating apparatus (a "robot" or automated tool), or by an operator when the laying depth so permits.

When watertight connection has been performed, electric and/or optical and mechanic connections between the first and second phase connectors contained, respectively, into the submersible and submerged case 11, 12 can take place.

Figure 8:
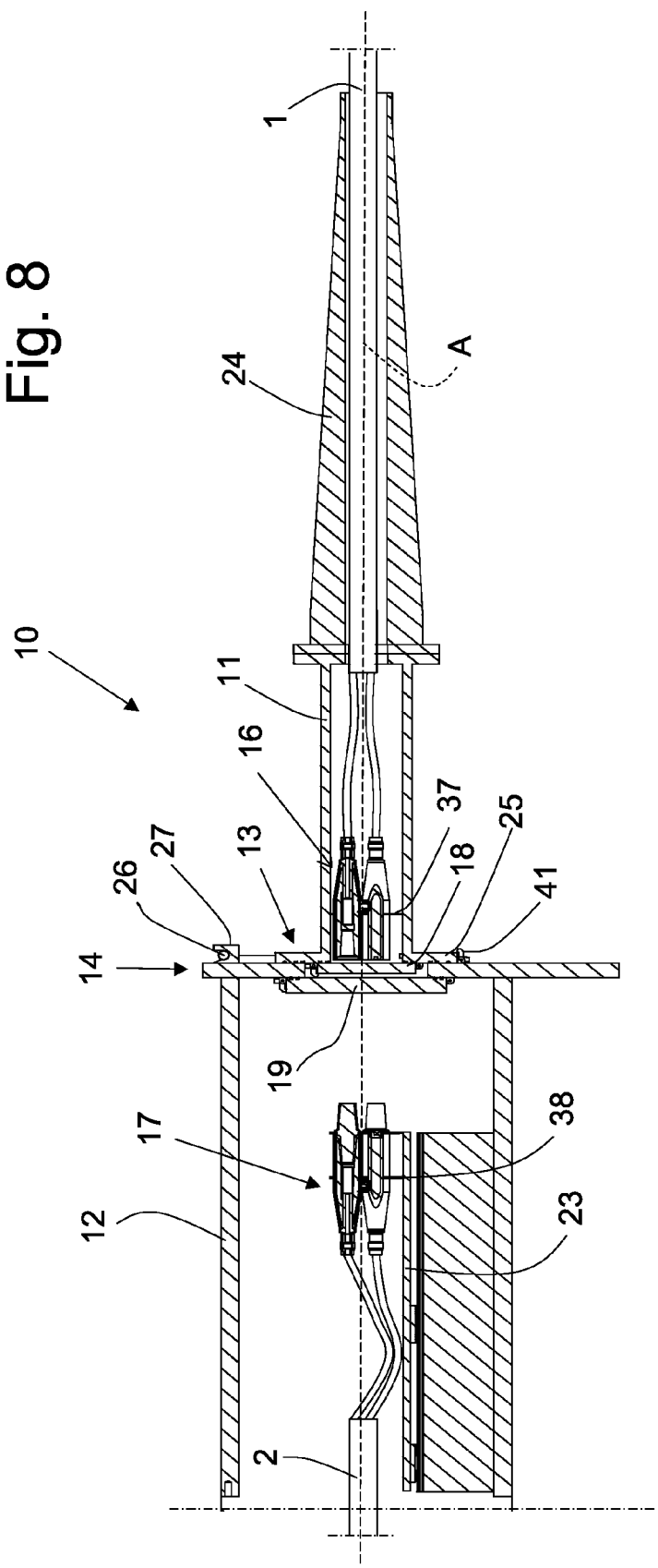
FIGS. 8 and 9 show an example of wet mateable connector installed according to the method of the invention.
Figure 9:
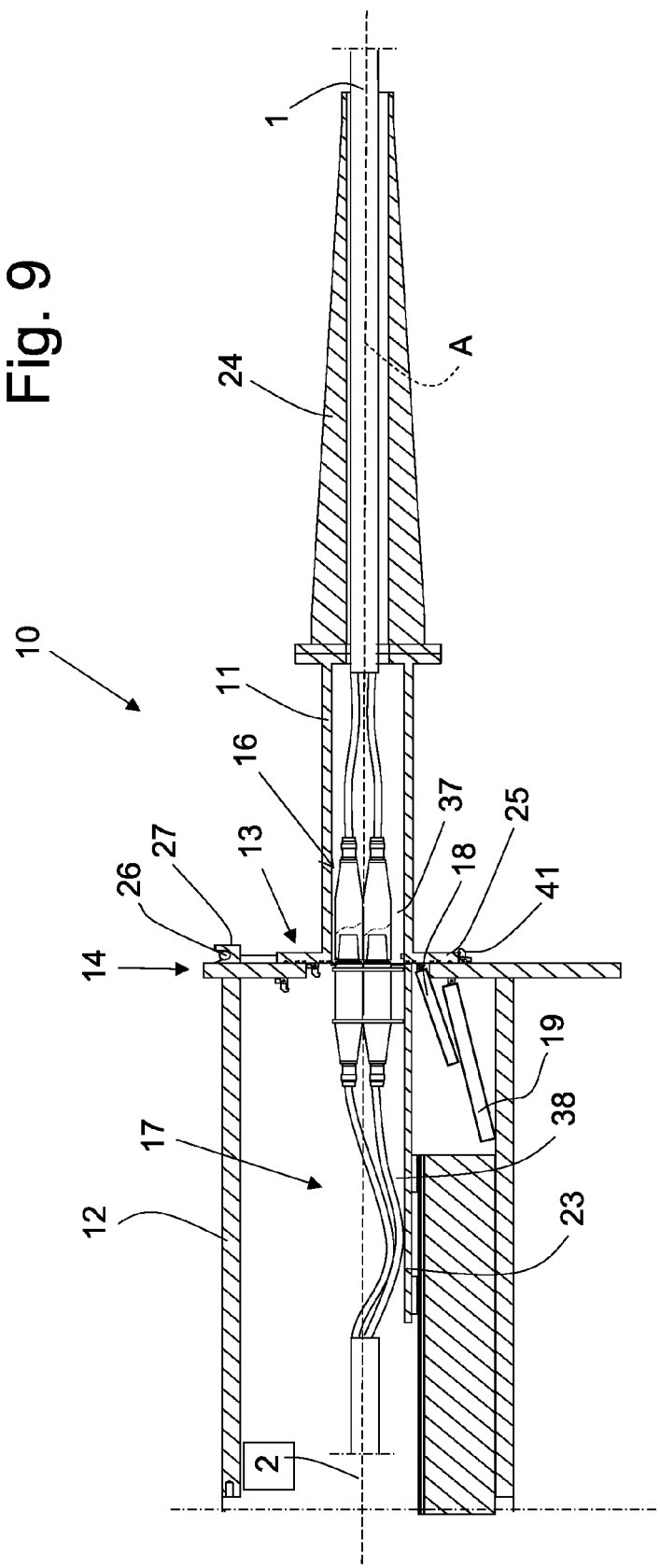

As shown in FIGS. 8 and 9, the submersible case 11 has a first gate 18 of and the submerged case 12 has a second gate 19. The gates 18 and 19 are opened in a sequence suitable for maintaining the water-tightness of the assembly 10 and leaving the connecting interface substantially dry. To this end, preferably gate 18 and/or gate 19 comprise a plurality of sealing rings. Gate 19 is the first to open.

The submersible case 11 houses first phase connectors 16, supported by a relevant cage 37 arranged inside the submersible case 11; in the present case, the phase connectors 16 are coupled to corresponding cable phases of a three phase cable 1.

The submerged case 12 houses second phase connectors 17 supported by a relevant movable cage 38. The phase connectors 17 are coupled to respective cable phases of a three phase cable 2.

The portion of the three phase cable 2 watertightly housed in the case 12 has a length—for example 1-1.5 m—suitable to enable the movement of the phase connectors 17 from a distal position to a connecting position, as explained in detail hereafter.

The first phase connectors 16 are fixed with respect to the submersible case 11 to face the coupling end 13, while the second phase connectors 17 are mounted on a bearing structure 23. The bearing structure 23—and, according, the second phase connectors 17—is mobile from a distal position, where the second phase connectors 17 are spaced from the coupling end 14, to a connecting position where the second phase connectors 17 extend through coupling end 14 toward the first phase connectors 16 so as to connect thereto to establish the sought electrical and/or optical and mechanical couplings.

The opening of gate 18, 19 and the moving of the second phase connectors 17 are remotely operated, for example by a low voltage power feed line brought by a ROV.

In case of unmating, the above outlined procedure is followed substantially on reverse, by sending a ROV to the connection 10 for bringing power to the system.

The phase connectors 16, 17 are uncoupled by moving the bearing structure 23—and, according, the second phase connectors 17—away from the coupling end 14. Subsequently the gates 18, 19 are closed to re-establish the water-tightness of the cases 11, 12.

The fixing between the cases 11, 12 is removed by a remotely operated underwater vehicle (ROV) bearing a suitably arranged "robot or automated tool, or by an operator when the laying depth so permits.

In the case the guiding rope 40 is not present with the connection, having been previously detached from the seat 27 and the guide handle 26, a ROV or an operator provides for re-establishing the rope connection. Another rope, which can be positioned as the auxiliary rope 40a was, is analogously secured to the submersible case 11 to act as traction rope. Alternatively, cable 1 itself can perform this traction function.

When the cable is pulled for its retrieval, the vertical component of the applied traction provides for the disengagement of the handle from the seat.

The present method allows an easy and safe installation and uninstallation of a wet mateable connection assembly, even when the latter is heavy and/or the environmental condition are cumbersome. The ROVs possibly employed in some of the ancillary steps of this method (e.g. providing low voltage electrical connection to the submersed case, attaching and detaching the ropeway etc.) are of significantly smaller dimensions and lower cost than those envisaged for moving and aligning cases containing phase connectors, being required to bear only few tens kilos loads. For example, suitable ROVs to be employed in the above ancillary steps of the invention are those classified in the literature as "observation class", while ROVs for moving cases should fall within the "special use" class (see for example The Maritime Engineering Reference Book, A. F. Molland, Elsevier Ltd., 2008, page 741).

The invention claimed is:

1. A method for underwater installing of a wet mateable connection assembly, comprising:
    providing a submerged case having a seat on a second coupling end of the submerged case;
    connecting one end of a guiding rope to the seat, an other end being kept over the sea level;
    providing a submersible case having a guide handle on a first coupling end of the submersible case, the guide handle engageable with the seat;
    appending the submersible case to the guiding rope by the guide handle;
    causing the submersible case to move along the rope until the guide handle engages with the seat; and
    pivoting the submersible case around the seat up to contact the submerged case.

2. The method according to claim 1, wherein the submersible and submerged cases of the wet mateable connection assembly contain respective first and second phase connectors mechanically and electrically connected with respective electric or optical or hybrid cable.

3. The method according to claim 1, comprising suspending the submersible case to an auxiliary rope before moving the submersible case.

4. The method according to claim 3, wherein one end of the auxiliary rope is connected to an auxiliary point of the submersible case, said auxiliary point being longitudinally spaced from the guide handle.

5. The method according to claim 3, wherein the guiding rope and, optionally, the auxiliary rope, sustain the submersible case by a suspender provided at a point upstream the guide handle.

6. The method according to claim 5, wherein along the cable more suspenders are installed to engage the guiding rope to the cable.

7. The method according to claim 5, wherein along the cable, more suspenders are installed to engage the auxiliary rope to the cable.

8. The method according to claim 1, wherein the guide handle has a V shape.

9. The method according to claim 1, wherein the seat protrudes from a second coupling end in a direction substantially parallel to a connecting axis.

10. The method according to claim 1, wherein the seat has a U or hook-like shape.

11. The method according to claim 1, wherein during causing the submersible case to move along the rope, the rope is kept at a tension load suitable for maintaining the submersible case at an angle greater than 20°.

12. A wet mate connection assembly comprising a submersible and a submerged case mated along a connecting axis, said cases having respective first and second coupling ends, the first coupling end having a guide handle protruding substantially perpendicularly with respect to the connecting axis; and the second coupling end having a seat, the guide handle being engaged with the seat.

13. The method according to claim 1, wherein pivoting the submersible case around the seat up to contact the submerged case is performed by releasing the tension on the guiding rope.

* * * * *